United States Patent [19]
Ernst

[11] Patent Number: 5,890,133
[45] Date of Patent: Mar. 30, 1999

[54] METHOD AND APPARATUS FOR DYNAMIC OPTIMIZATION OF BUSINESS PROCESSES MANAGED BY A COMPUTER SYSTEM

[75] Inventor: Michael Ernst, Boeblingen, Germany

[73] Assignee: International Business Machines Corp., Armonk, N.Y.

[21] Appl. No.: 718,055

[22] Filed: Sep. 17, 1996

[51] Int. Cl.$^6$ .................................................. G05B 13/00
[52] U.S. Cl. ........................................ 705/7; 705/8; 707/2
[58] Field of Search .............................. 705/7, 8; 707/2, 707/102; 395/200.32

[56] References Cited

U.S. PATENT DOCUMENTS

| | | | |
|---|---|---|---|
| 5,301,320 | 4/1994 | McAtee et al. | 705/9 |
| 5,630,069 | 5/1997 | Flores et al. | 705/7 |
| 5,721,913 | 2/1998 | Ackroff et al. | 395/614 |

*Primary Examiner*—Thomas Peeso
*Attorney, Agent, or Firm*—A. Bruce Clay

[57] ABSTRACT

The invention relates to a method and a device for the dynamic optimization of business processes, the business process instances of a business process being managed by a workflow management computer system. The invention is in particular characterized by collecting, investigating and storing parameters, processing data and result data, and subsequently optimizing business processes on the basis of stored information by identifying a business process instance having propitious result data, modifying the parameters of said instance and subsequent verification of such modification. The invention is further characterized by the use of genetic algorithms and orthogonal matrices for the modification of the parameters of the identified business process instance with propitious result data. The invention is suitable for being used in the process optimization in production engineering and plant engineering and in process optimization in the service field.

13 Claims, 4 Drawing Sheets

| Type | Number | Time |
|---|---|---|
| Expert for A1 | 2 | 5 minutes |
| Novice for A1 | 2 | 10 minutes |
| Expert for A2 | 2 | 15 minutes |
| Novice for A2 | 2 | 30 minutes |
| Expert for A3 | 2 | 5 minutes |
| Novice for A3 | 2 | 7 minutes |

FIG. 4

|  | Activity A1 | | Activity A2 | | Activity A3 | |
|---|---|---|---|---|---|---|
|  | Expert | Novice | Expert | Novice | Expert | Novice |
| Set 1 | 1 | 0 | 2 | 0 | 0 | 2 |
| Set 2 | 2 | 0 | 1 | 1 | 2 | 0 |

FIG. 5A

|  |  | Target | Calculated | Real |
|---|---|---|---|---|
| Set 1 | Average runtime |  | 29 | 25 |
| Set 1 | Maximum runtime | under 90 | 52 | 47 |
| Set 1 | Customers' satisfaction | over 90 |  | 95 |
| Set 2 | Average runtime |  | 36 | 32 |
| Set 2 | Maximum runtime | under 90 | 70 | 55 |
| Set 2 | Customers' satisfaction | over 90 |  | 91 |

FIG. 5B

| Set 3 | Average runtime |          | 32 |
|-------|-----------------|----------|----|
| Set 3 | Maximum runtime | under 90 | 50 |
| Set 3 | Customers' satisfaction | over 90 |    |

FIG. 5C

|       |                         | Target   | Calculated | Real |
|-------|-------------------------|----------|------------|------|
| Set 1 | Average runtime         |          | 29         | 25   |
| Set 1 | Maximum runtime         | under 90 | 52         | 47   |
| Set 1 | Customers' satisfaction | over 90  |            | 95   |
| Set 3 | Average runtime         |          | 32         | 30   |
| Set 3 | Maximum runtime         | under 90 | 50         | 49   |
| Set 3 | Customers' satisfaction | over 90  |            | 97   |

METHOD AND APPARATUS FOR DYNAMIC OPTIMIZATION OF BUSINESS PROCESSES MANAGED BY A COMPUTER SYSTEM

TECHNICAL FIELD

The present invention relates to a method and apparatus for dynamic optimization of business processes managed by a workflow management computer system. The invention is suitable for use with process optimization in production engineering and plant engineering and with process optimization in the service sector.

BACKGROUND OF THE INVENTION

The ever growing worldwide expansion of enterprises together with the requirement of rationalization of production processes leads increasingly to a reorganization of the business processes involved.

In "Workflow Management: Integration von Organisation und Informationsverarbeitung" by H. Heilmann, HMD, 176, 1994, pages 8–21, a business process which leads up to the creation or utilization of enterprise performance is termed a delimitable, often job-sharing process. In this context, the center of consideration is the dynamic progress of the process from initiation to conclusion. Frequently, the term "workflow" is used instead of the term "business process".

In "Business Process Management with FlowMark" by F. Leymann and D. Roller, Digest of Papers, Cat. No. 94CH3414-0, Spring COMPCON 94, 1994, pages 230 to 234, the Workflow Management System, IBM FlowMark is described. The possibilities of modeling business processes are presented, and the execution of the WorkFlow Management is described.

The desire of the enterprise to optimize its business processes is the catalyst for the reorganization of its business processes. Due to the complexity and the close interconnection of business processes within an enterprise, optimization of business processes offers a giant savings potential with regard to energy, time and expense. Furthermore, the quality of products can be improved due to the optimization of the processes, and the competitiveness of the enterprise will be improved due to higher flexibility and shorter response times.

Previously known methods for optimization of business processes are based upon a simulation concept. These known methods attempt to determine, on the basis of assumptions, the effect of altering the use of resources upon the business targets of the business process. Calculations are carried out using various resource parameters in order to optimize the business process regarding such business targets.

In this context, resources are to be understood to be all participants in the course of the business process, including machines, humans, computer programs, etc. As a rule, business targets are prefixed by the enterprise and include, for example, turnover, quality, cost or runtime.

In T. Jaeger et al.: "A Framework for Automatic Improvement of Workflows to Meet Performance Goals", Proceedings Sixth International Conference on Tools with Artificial Intelligence, New Orleans, La., USA, Nov. 6–9, 1994 IEEE Comput. Soc. Press. Los Alamitos, Calif., USA, ISBN 0 8186 6785 0, a method for the optimization of business processes is presented. The presented method uses query techniques from the technical area of Artificial Intelligence (AI) in order to control modifications of the system model. Also in that method, estimations are made, such as how a modification of the resources will act upon the medium process time of an activity in a business process. Optimizations of the business process are based upon such estimations.

Known business process optimization procedures require the finding of parameters that affect the business process and modeling (as well as quantifying) the extent of the influence of such parameters; in particular, it is required to make assumptions concerning the influence of modifications or redistribution of the available resources. Such qualification and quantification of the influencing parameters require a great deal of administrative effort. A further disadvantage of the prior methods is that the influence of such parameters is dynamic, meaning that they, as a rule, will change over the course of time. This necessitates checking the validity of the assumed quantification.

There is the further disadvantage in that not all of the influencing parameters may be qualified or even quantified. So, there are parameters which escape a modelation and quantification due to their nature and appearance; e.g., items such as customer satisfaction with their causal interconnections cannot be determined with mathematical precision. By the same token, the saving of time due to the use of a supporting computer program may vary depending on such items as corporate culture or employment of collaborators which, in turn, are too complex to be described exactly.

It is therefore an object of the present invention to provide a method and apparatus for conducting business process management with a computer system, in which the influencing parameters do not require explicit determination, modeling and quantification.

It is a further object of the invention to take into consideration the dynamic behavior of the flow of business processes during the optimization of a business process while keeping the technical effort as low as possible.

It is a further object of the invention to provide a method and a device for the management of a business process with a computer system that takes into account all influencing parameters acting in reality during the optimization of the business process.

SUMMARY OF THE INVENTION

The object of the invention is obtained by the procedures, devices and uses as disclosed in the independent patent claims. Advantageous embodiments of the invention are disclosed in the dependent patent claims pertaining thereto.

The business process may be any kind of process occurring in an enterprise; in particular, it may concern the production process of a passenger car in an enterprise of the motor car industry, the technological process of a silicon transistor in an enterprise of the semiconductor industry, or the method of applying for credit in an enterprise in the field of credit institutes.

By the terms "Workflow Management" or "Management of Business Processes", both the definition of the Business Process and, in particular, the carrying-out of such business processes is to be understood. The carrying-out may, in this respect, be advantageously controlled by a computer.

The term "Business Process Instance" is to be understood to include the events of the actual carrying-out of a business process. For example, in the business process "Credit Application" comprising all actions connected with a credit application, the business process instance corresponds to the event of processing an actual and identifiable credit application, e.g., by Mr. Hans Müller. In analogy thereto, various instances of a business process may develop under various different conditions; e.g., in the credit application by Hans Müller the credit limit calculation may be made with a first computer program, while in a credit application by Mr. Karl Maier, the credit limit calculation is made with a second computer program. In such cases there are Business Process Instances with different Parameter Settings.

The parameters valid for the respective business process instance are collected and stored together with an identification of the business process instance. Part thereof may include which persons were authorized for processing the various activities within the respective business process instance. Frequently, roles for the execution of activities are authorized and such roles are imparted to persons or machines. The collection of the parameters is dependent on the fact that such parameters must be first defined; the selection of parameters is typically ruled by predetermined business targets. By the same token, processing data is collected and stored, e.g., how long it took to complete a certain activity within the business process instance.

The resulting data, taken from the processing data, indicates the extent to which the business process instance meets the criteria of the business targets, and is stored. Moreover, the business targets (such as how long a certain business process is to last) may be stored. In doing so, the business targets may be modified and adapted to the respective object set by the respective enterprise.

Identification of a business process instance with propitious result data is carried out with a view of selecting favorable level settings of the business process instance. Level settings indicate the various implementations of the parameters of a business process instance and are described by a set of attributes. The verification is typically carried out by the production of the business process instance and is at par with processing data of the business process instances; the verification may be backed by a simulation in the incoming circuit on the basis of the performance characteristics predetermined by the level settings of the resource data. The maintenance of the business process modification is obtained by, again, carrying out the step of "Collecting processing data of the business process instances." This starts an iterative operation of the process optimization.

The stored information is the starting basis for the optimization of the business processes in accordance with the invention. It is advantageous that the stored information has been collected by an empirical method and is thereby a real image of reality. It is particularly advantageous that such real image is obtained with very low effort, as expensive modeling and quantification of the influencing parameters is eliminated, and the real occurring processes enter their parameters directly into the starting basis for the optimization of the business process.

The stored information is the starting basis for the business process according to the invention. It is advantageous that such information is empirically gained and is, therefore, a factual image of reality. It is particularly advantageous that the real image is obtained with very low effort since a complex modeling and quantifying of the influencing parameters is dispensed with, and the real rundown processes enter their parameters directly into the starting basis for optimization of the business processes.

It is furthermore advantageous that a process in accordance with the characteristics of claim 1 also collects the influences which occur in a business process management system which simultaneously controls a plurality of business processes. The behavior of all such processes and their instances which compete for the limited available resources is collected and, thereby, also their respective interdependence and influence (e.g., the influence of the existence of a first business process instance upon the course of a second business process instance) are collected without being compelled to model and to quantify the respective influence parameters. The first and second business process instances could thereby be derived from the same business process or from various different business processes.

In addition, it is advantageous that the optimization is made dynamic because each completed business process instance enters its parameters, processing and result data into the starting basis for the optimization of the business processes, keeping the starting basis, per se, continually updated with actual data.

There is the further advantage that both slowly developing deteriorations in the business process course may be detected thereby, and changes in the business targets can be taken into consideration, while the process steps, according to the invention, care for the required optimization.

The embodiment of claim 2 has the advantage that the partition of a business process into individual activities corresponds to the real course of the real processes in the enterprises and, therefore, a modeling of the business processes becomes feasible with low effort. The partition of a business process into single activities is also used by the IBM FlowMark Workflow-Management-System.

Resources required for the processing of business process instances refer to all participants which take part in the course of the business process, such as machines, human beings and computer programs.

In a further embodiment, the invention shows the characteristics in accordance with claims 3 and 4. It is advantageous that collecting, and particularly continuous collecting, of parameter changes, the regular identification and modification of a business process instance with propitious result data, and the regular verification of the business process instance thus modified, safeguards a permanent and dynamic optimization of the business process. It is furthermore advantageous that said dynamic optimization collects all real-effective influences in their concrete quality and, in particular, quantity without a time-consuming and costly modeling effort becoming necessary.

In a further embodiment, the invention shows the characteristics in accordance with claim 5. In this connection there is the advantage that the number of installed business process instances can be kept constant due to the identification and elimination of a business process instance with disadvantageous result data. The elimination of the business process instance with disadvantageous result data comprises, in particular, the withdrawing of the respective business process instance from being used for the formation of new business process instances. This has the advantageous result that business process instances having disadvantageous result data cannot transfer their undesirable properties to future business process instances.

In another embodiment, the invention shows the characteristics in accordance with claim 6. It is advantageous that, due to the modification of the parameters in accordance with the evolution-similar algorithms, in particular following the systematics of mutation/variation and selection, a reliable and quick approach to the optimum is safeguarded. In this respect there is the possibility of selecting from the plurality of possible variation techniques, e.g., a break-down of the parameter sets of two or more business process instances with propitious result data and subsequent rearrangement of the parts to make up a new parameter set. This variation embraces, in particular, the composition of a new combination of building-stones taken from a given set of building-stones. However, by so doing, there is to be taken into consideration a kind of modification which facilitates, in correspondence with the paragon of nature, the generation of new building stones and combinations thereof.

The selection comprises the maintenance of propitious process formations and the use of such propitious process formations for future steps of optimization. However, the exclusion of business process instances having unfavorable result data from future optimization processes should also be possible. For example, this may be achieved by a cancellation of the level settings associated therewith, or by a prioritization of level settings and respective criteria of priority for carrying out business processes with respective level settings and their utilization in view of optimization steps.

In D. E. Goldberg: "Genetic Algorithm in Search, Optimization, and Machine Learning", Reading/MA, Addison Wesley Edition 1989, the use of evolution-similar algorithms and, in particular, genetic algorithms in technical fields is described. In particular, the possibilities of genetic algorithms in the field of search and optimization techniques are presented.

A further embodiment of the invention shows the characteristics in accordance with claims 7 and 8. It is advantageous that the use of the method of orthogonal matrices guarantees a quick approach to the optimum of the business process with very little verification or with very few steps of approach, respectively.

In J. Krottmaier: "Versuchsplanung", Edition Industrielle Organization, 1994, the method of the orthogonal matrices in the form of the so-called "TAGUCHI-STYLE" experiments is presented, and their possible uses and advantages are discussed. The appertaining theory is to be found in W. G. Cochran and G. M. Cox: "Experimental Design", John Wiley & Sons Edition, New York 1957. In G. Z. Yin and D. W. Jillie: "Orthogonal Design for Process Optimization and its Application in Plasma Etching", Solid State Technology, 1987, pages 127 through 138, an application of the method of orthogonal matrices in the field of plasma etching in semiconductor technology is presented.

By the calculable portions of the results as addressed in claim 8, the pre-appraisable business targets are to be understood to be the running time of the process and the cost. Business targets which are not pre-appraisable, but may be found due to the production only, must also be taken into consideration; such items are termed "customer satisfaction". Mixed forms of the modification techniques disclosed in claims 7 and 8 are possible as described in claim 9.

In another embodiment, the invention shows the characteristics in accordance with claims 10 through 13. In the respective embodiments, the same advantages are realized, mutatis mutandis, which are stated with reference to the respective method claims.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 4 shows the level settings Set 1 and Set 2 of the components or the activities of the business processes respectively;

FIG. 5A shows the results of the process instances which were carried out with reference to the level settings Set 1 and Set 2;

FIG. 5B shows the data resulting from simulations of the level settings Set 3; and FIG. 5C shows the data resulting from process instances which were carried out using the level settings of Set 1 and Set 3.

DETAILED DESCRIPTION OF THE INVENTION

The embodiment of the invention as illustrated in the Figures describes an optimization process which links what takes place within the frame of a process occurrence with the reasons why it occurs. Modification of the process is determined on the basis of effect upon the process, e.g., on the basis of effect upon the running time of the process or on the approach to the business targets. Such fixing may be done while using orthogonal matrices in so-called TAGUCHI-STYLE experiments for the definition of an optimum for business targets given.

Figure 1:
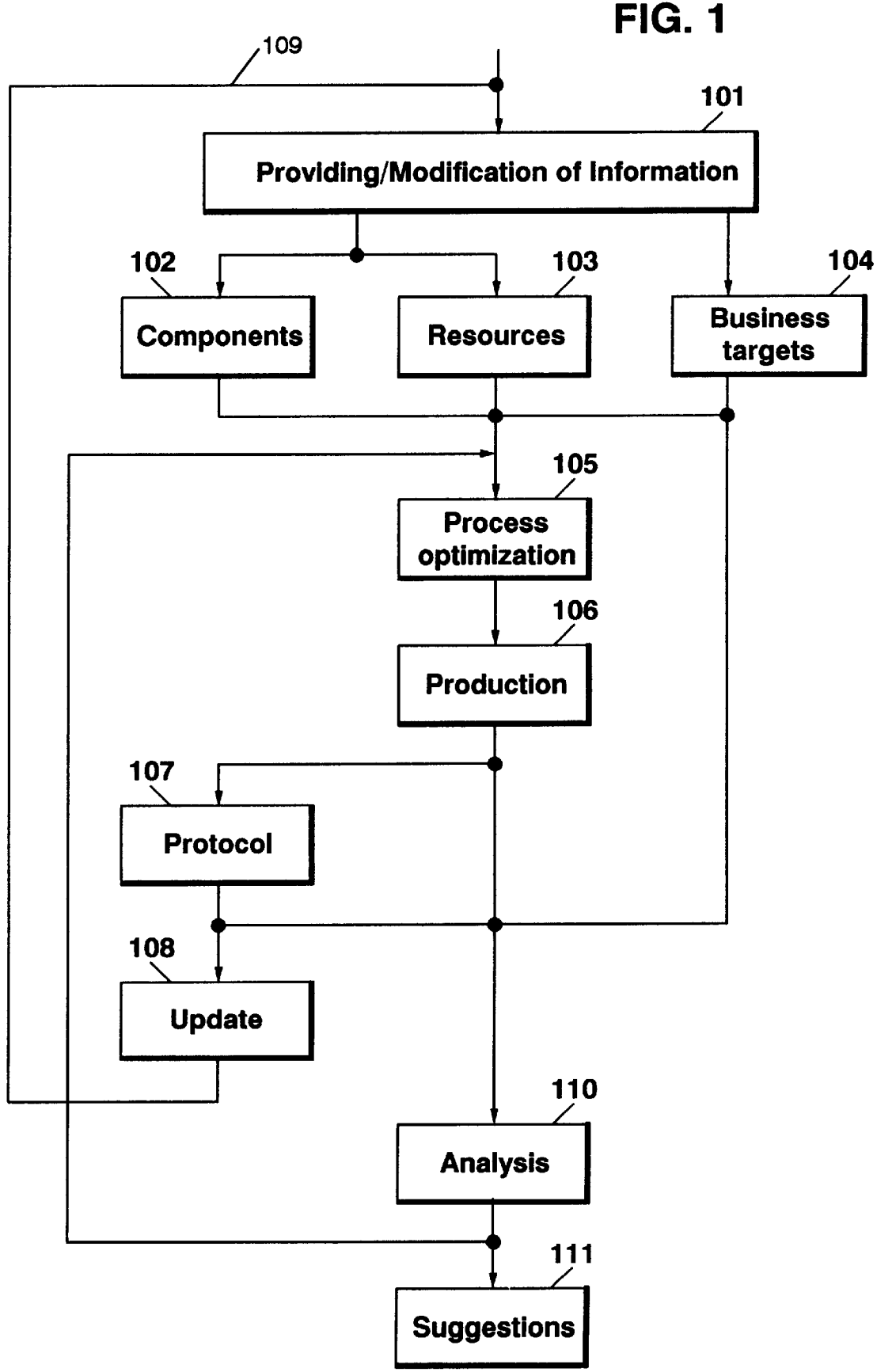
FIG. 1 shows a survey of the process in the form of a flow diagram.

FIG. 1 represents a procedure survey in the form of a flow diagram. In a first procedural step 101, the required pieces of information are provided. In Step 102, all components of the workflow are composed and described. A workflow component is thereby an activity in the process flow or a sub-workflow. The workflow component is thereby considered to be a parameter or a factor. The various implementations are regarded to be level settings which are described by a set of attributes such as manner of execution, costs, runtime, associated role, associated program, etc.

For example, the parameter or activity of "Signature Check" respectively possesses two level settings:

Level setting 1 having the attributes of:
    manually, 2 US$, 30 minutes, finance expert, no program;

Level setting 2 having the attributes of:
    automatically, 8 US$, 1 minute, no role, CHECK program.

In a further Step 103, the available resources are sensed and described. The resources are identified as further parameters which are likewise considered to be level settings described by attributes, such as availability or running time of a program. Following the above example, the finance expert is considered to be a resource or a parameter with a level setting of "5", meaning that there are 5 persons available who fit the role of finance expert.

The CHECK program has two level settings:

Level setting 1 with the attributes:
    five, 10 seconds;

Level setting 2 with the attributes:
    two, 5 seconds.

The level setting 1 shows 5 program licenses of a release 1 which show an execution time of 10 seconds, whereas level setting 2 shows two program licenses of a release 2 which have an execution time of 10 seconds.

In a further Step 104, business targets are defined, such as throughput, cost and customer satisfaction.

In a further Step 105, level settings, which meet the precalculable business targets, are found by an optimization process. In the above example, such precalculable business targets are throughput and costs. The optimization step 105 may be carried out, for example, by the method of orthogonal matrices or by the use of genetic algorithms.

In a further Step 106, the identified level settings are taken over into production in order to find the optimum workflow with regard to the non-precalculable business targets. In the above example, that would be customer satisfaction. Thereby, in Step 107, the run data is used for verifying the result data and, per Step 108, for updating the attribute values of the parameters upon the latest state. By this measure, the workflow is dynamically adapted to the actual process behavior.

Possible modifications of components and business targets (such as modifying the business target "costs" or additional resources, if available) are taken into consideration through the feedback branch 109. Each modification of a workflow component or a resource is treated like an additional level setting which initiates a further cycle of experiments per Step 105. That, in connection with the attribute values updated upon the latest state of the parameters, and the result data lead to a dynamic optimization of the workflow.

In Step 110, an analysis or a verification, respectively, of the business process data permits various possibilities of process optimization. The alternative parameters may also be used for reacting upon exceptional situations, such as authorizing a second resource group to carry out a specific activity for coping with a peak load. By the same token, introducing hypothetical level settings for resources would permit suggestions in step 111 as to the organization of the enterprise or of the information-technical infrastructure in order to provide optimum support for the present processes. Furthermore, the dominating factors could be determined, thus facilitating a redesign of the business processes in a very efficient manner.

Figures 2, 3:
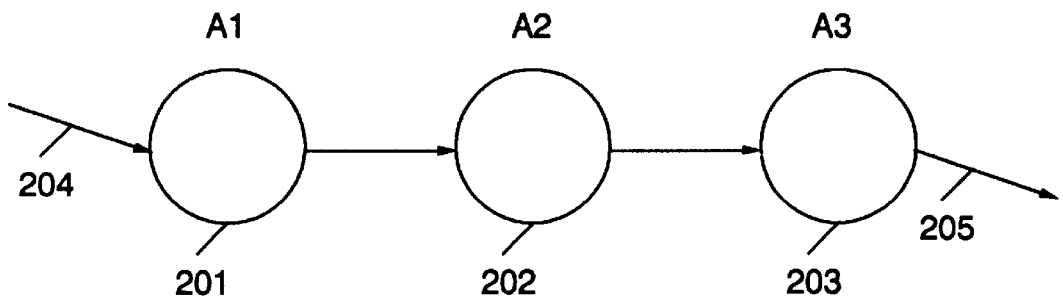
FIG. 2 illustrates a simple business process consisting of three activities A1 201, A2 202, and A3 203.
FIG. 3 shows the level settings of the resources for the activities of the business processes of FIG. 2.

FIG. 2 shows a simple business process comprising three activities: A1, identified by reference numeral 201; A2, identified by reference numeral 202; and A3, identified by reference numeral 203. For reasons of simplicity, no parallel activities are taken into consideration. By the same token, no so-called "task bundles" were taken into consideration as are possible in modern business process management systems. For the same reason, the above simple example does not treat the possibility that a business sub-process would hide behind an activity which starts and develops like any activity, and may be regarded as such. At 204 the process is started by the first activity A1 and ends at 205 by the completion of the last activity A3. In the example under consideration, this process is initiated five times per hour.

FIG. 3 shows that, in the present case, the number of employees of a certain qualification level is used as a parameter. In the present example there is a distinction between a first qualification level "Novice" and a second qualification level "Expert". For both qualification levels, processing times for the respective activity are assessed.

For activity A1, there are two available experts, each with an assessed processing time of 5 minutes, and two novices, each with an assessed processing time of ten minutes. For activity A2, there are two available experts, each with an assessed processing time of fifteen minutes, and two novices each with an assessed processing time of thirty minutes. For activity A3, there are two available experts, each with an assessed processing time of five minutes, and two novices, each with an assessed processing time of seven minutes.

The business targets of this process refer to an appreciable item GZ1, the total runtime of a business process instance, and a non-appreciable item GZ2, customer satisfaction. It is determined that the total runtime of a business process instance should amount to less than 90 minutes, and customer satisfaction should be higher than an index of 90. The GZ2 business target has priority over the GZ1 business target.

On the basis of such values, the level settings for the components may be found which attain the appreciable GZ1 business target. Two such settings (which do not need to be optimum) are taken over into production; they are the settings as represented in FIG. 4.

In the first level setting Set 1 there are provided:
for activity A1,
one expert and no novice;
for activity A2,
two experts and no novice; and
for activity A3,
no expert and two novices.
The simulated results show:
a medium runtime of 29 minutes and
a maximum runtime of 52 minutes.
In the second level setting Set 2 there are provided:
for activity A1,
two experts and no novice;
for activity A2,
one expert and one novice; and
for activity A3,
two experts and no novice.
The simulated results show:
a medium runtime of 36 minutes and
a maximum runtime of 70 minutes.

Each one of these level settings is used for a certain number of business process instances. The results are found on the basis of the real-processed process instances, and, in this way, the non-appreciable business targets may be obtained. In the present example, customer satisfaction is a non-appreciable business target.

For level setting Set 1 there is found:
medium runtime: 25 minutes,
maximum runtime: 47 minutes and
customer satisfaction index: 95.
For level setting Set 2 there is found:
medium runtime: 32 minutes,
maximum runtime: 55 minutes and
customer satisfaction index: 91.

Such data is illustrated in FIG. 5A. Both level settings have obtained the given business targets with differing quality (as evidenced by the variations in the customer satisfaction results).

Based on results, there may also be modifications of the simulation assumptions. For example, there may be found that the processing time of an expert assessed with five minutes for the activity A1 really takes ten minutes; in such a case, the values of the level setting of the resource "Expert A1" will have to be changed accordingly.

Now, a third level setting is formed from the two given level settings. Such can be made in accordance with one of the plurality of possible genetic algorithms. In the case under consideration, the settings of the various activities are "inherited" from one of the "parent" settings, each according to a pattern 2-1-2. Pattern 2-1-2 means that the new setting Set 3 as regards activity A1 inherits from Set 2, as regards activity A2 inherits from Set 1, and as regards activity A3 inherits from Set 2.

Therefore, in the third level setting set 3 there are provided:

for activity A1,
two experts and no novice (See FIG. 4, activity A1, Set 2);

for activity A2,
two experts and no novice (See FIG. 4, activity A2, Set 1); and for activity A3,
two experts and no novice (See FIG. 4, activity A3, Set 2).

The simulated result for Set 3 shows:
a medium runtime of 32 minutes, and
a maximum runtime of 50 minutes, and is represented in FIG. 5B.

Therefore, Set 3 is taken over into production; whereas Set 2, being a variant with the less advantageous result data (Set 2 has the longest average and actual runtime and the lowest customer satisfaction when compared to Set 1 and Set 3), is removed from production. Thus, Set 3 meets a predetermined criteria for desirability and is used to modify the parameters. Level settings Set 1 and Set 3 which now are used for process optimization, show the following results which are represented in FIG. 5C:

For level setting Set 1 there is found:
medium runtime: 25 minutes,
maximum runtime: 47 minutes and
customer satisfaction index: 95.

For level setting Set 3 there is found:
medium runtime: 30 minutes,
maximum runtime: 49 minutes and
customer satisfaction index: 97.

For clarity and logical coherence, identical result data was used for the result of level setting Set 1 before and after the first optimization step. It is self-evident that the resulting values of real processed process instances may be subject to slight statistic variations even with identical level settings and a substantially unaltered process behavior.

The results for the level setting Set 3 show clearly an improvement of the process behavior due to this first iteration step. By further iterations, a continual and dynamic optimization of the process behavior is obtained.

Although the present invention has been described with respect to a specific preferred embodiment thereof, various changes and modifications may be suggested to one skilled in the art; and, it is intended that the present invention encompass such changes and modifications as fall within the scope of the appended claims.

I claim:

1. An automatic method for optimizing a business process, wherein said business process is repeatedly carried out as business process instances, said business process instances represented by digital data in a workflow management computer system and managed by said computer system, comprising the steps of:

collecting parameters of said business process instances;
collecting business targets;
collecting runtime processing data of said business process instances;
evaluating result data of said business process instances;
storing said parameters, said business targets, said runtime processing data, and said result data of said business process instances;
identifying a first completed business process instance which has result data meeting predetermined criteria, out of a set stored business process instances;
modifying said parameters of said business process using said identified first completed business process instance; and
verifying said business process modification.

2. The method as claimed in claim 1, wherein:

the business process is provided with a plurality of activities;
a limited number of resources is available for the processing of the business process instances; and
the parameters of the business process instances are formed by associating resources with the activities.

3. The method as claimed in claim 2, wherein the following step is further provided:

collecting changes of the parameters of the business process instances.

4. The method as claimed in claim 3, wherein said step of identifying further comprises:

reiterating said step based upon a predefined cycle.

5. The method as claimed in claim 4, providing further the following steps:

identifying another completed business process instance which shows disadvantageous result data when compared to the plurality of stored business process instances; and
eliminating said another completed business process instance which shows disadvantageous result data.

6. An automatic method for optimizing a business process, wherein said business process is repeatedly carried out as business process instances, said business process instances represented by digital data in a workflow management computer system and managed by said computer system, comprising the steps of:

collecting parameters of said business process instances;
collecting business targets;
collecting runtime processing data of said business process instances;
evaluating result data of said business process instances;
storing said parameters, said business targets, said runtime processing data, and said result data of said business process instances;
identifying a first business process instance which has result data meeting predetermined criteria, out of a set of stored business process instances;
modifying said parameters of said business process using said identified first business process instance;
verifying said business process modification;
wherein said step of modifying said parameters comprises:
modifying in accordance with evolution-similar algorithms, in particular, in accordance with genetic algorithms, wherein a variation is obtained by crossing parameters of various business process instances; and
a selection is accomplished by selecting the verified business process modification.

7. An automatic method for optimizing a business process, wherein said business process is repeatedly carried out as business process instances, said business process instances represented by digital data in a workflow management computer system and managed by said computer system, comprising the steps of:

collecting parameters of said business process instances;
collecting business targets;

collecting runtime processing data of said business process instances;

evaluating result data of said business process instances;

storing said parameters, said business targets, said runtime processing data, and said result data of said business process instances;

identifying a first business process instance which has result data meeting predetermined criteria, out of a set of stored business process instances;

modifying said parameters of said business process using said identified first business process instance;

verifying said business process modification;

wherein said step of modifying comprises:
  modifying in accordance with a method of orthogonal matrices; and
  parameters of said identified first business process instance are made starting parameters for a draft of an orthogonal matrix.

8. An automatic method for optimizing a business process, wherein said business process is repeatedly carried out as business process instances, said business process instances represented by digital data in a workflow management computer system and managed by said computer system, comprising the steps of:

collecting parameters of said business process instances;

collecting business targets;

collecting runtime processing data of said business process instances;

evaluating result data of said business process instances;

storing said parameters, said business targets, said runtime processing data, and said result data of said business process instances;

identifying a first business process instance which has result data meeting predetermined criteria, out of a set of stored business process instances;

modifying said parameters of said business process using said identified first business process instance;

verifying said business process modification, further comprising:
  verifying results of said business process modifications within their calculable part based upon simulations in accordance with a method of orthogonal matrices.

9. An automatic method for optimizing a business process, wherein said business process is repeatedly carried out as business process instances, said business process instances represented by digital data in a workflow management computer system and managed by said computer system, comprising the steps of:

collecting parameters of said business process instances;

collecting business targets;

collecting runtime processing data of said business process instances;

evaluating result data of said business process instances;

storing said parameters, said business targets, said runtime processing data, and said result data of said business process instances;

identifying a first business process instance which has result data meeting predetermined criteria, out of a set of stored business process instances;

modifying said parameters of said business process using said identified first business process instance;

verifying said business process modification;

wherein said step of modifying comprises;
  modifying of the parameters of said identified first business process instance in accordance with a mixed form of an evolutionary algorithm, in particular, a genetic algorithm, and a method of orthogonal matrices.

10. A device for automatic optimization of a business process, wherein said business process is repeatedly carried out as business process instances, said business process instances represented by digital data in a workflow management computer system and managed by said computer system, said device comprises:

first protocolling means for collecting parameters of said business process instances;

second protocolling means for collecting business targets;

third protocolling means for collecting runtime processing data of said business process instances;

calculating means for evaluating result data of said business process instances;

storage means for storing said parameters, said business targets, said runtime processing data, and said result data of said business process instances;

means for identifying a first completed business process instance which shows result data meeting predetermined criteria, out of all stored said business process instances;

means for modifying said parameters of said business process using said identified first completed business process instance; and means for verifying said modified business process.

11. The device as claimed in claim 10, further comprising:

means for sensing changes of said parameters of the business process instances;

means for identifying another completed business process instance with disadvantageous result data when compared to the plurality of stored business process instances; and means for eliminating said another completed business process instance which shows disadvantageous result data.

12. A device for automatic optimization of a business process, wherein said business process is repeatedly carried out as business process instances, said business process instances represented by digital data in a workflow management computer system and managed by said computer system, said device comprises:

first protocolling means for collecting parameters of said business process instances;

second protocolling means for collecting business targets;

third protocolling means for collecting runtime processing data of said business process instances;

calculating means for evaluating result data of said business process instances;

storage means for storing said parameters, said business targets, said runtime processing data, and said result data of said business process instances;

means for identifying a first business process instance which shows result data meeting predetermined criteria, out of all stored said business process instances;

means for modifying said parameters of said business process using said identified first business process instance;

means for verifying said modified business process;

wherein said means for modifying comprises:

means for modifying in accordance with at least one of an evolutionary algorithm, in particular a genetic algorithm, or a method of orthogonal matrices, or a mixed form of the evolutionary algorithm, in particular a genetic algorithm and a method of orthogonal matrices.

13. The device as claimed in claim 12, wherein:

said device is integrated into the workflow management computer system.

* * * * *